July 28, 1931.  O. HAUGE  1,815,911

PASTRY CONE BAKING MACHINE

Filed Aug. 26, 1929   3 Sheets-Sheet 1

INVENTOR.
Oscar Hauge.
BY
Townsend, Loftus & Abbett
ATTORNEYS.

July 28, 1931.  O. HAUGE  1,815,911
PASTRY CONE BAKING MACHINE
Filed Aug. 26, 1929  3 Sheets-Sheet 3

INVENTOR.
Oscar Hauge.
BY
Townsend, Loftus & Abbett
ATTORNEYS.

Patented July 28, 1931

1,815,911

UNITED STATES PATENT OFFICE

OSCAR HAUGE, OF SAN MATEO, CALIFORNIA, ASSIGNOR TO NATIONAL BISCUIT COMPANY, A CORPORATION OF NEW JERSEY

PASTRY CONE BAKING MACHINE

Application filed August 26, 1929. Serial No. 388,555.

This invention relates to pastry baking machines, and particularly pertains to an automatic pastry cone baking.

It is the principal object of the present invention to improve the construction and operation of machines of the character referred to, whereby to provide a pastry cone baking machine of large capacity which is fully automatic in operation, and not liable to require frequent overhauling ordinarily necessary in this type of machine due to the parts operating through intense heat.

In carrying out this object, I provide a horizontal rotatable table fixed upon which is a plurality of cores which depend from the lower surface thereof, and operative molds cooperative with these cores to form pastry cones. After the cones are formed between the cores and the molds, they are baked and automatically ejected. The cones are formed, baked and ejected from the machine during continuous cycles of operation of the machine.

Figure 1:
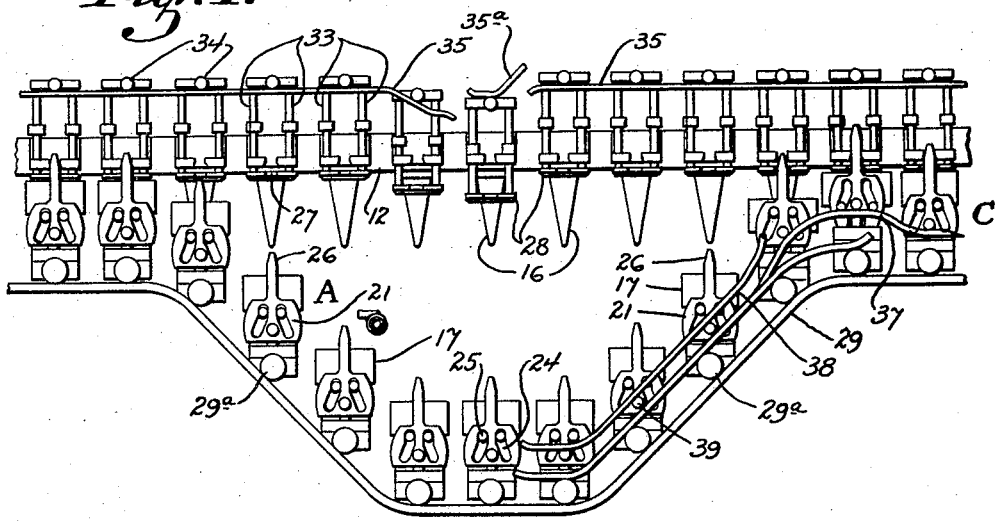
Figure 2:
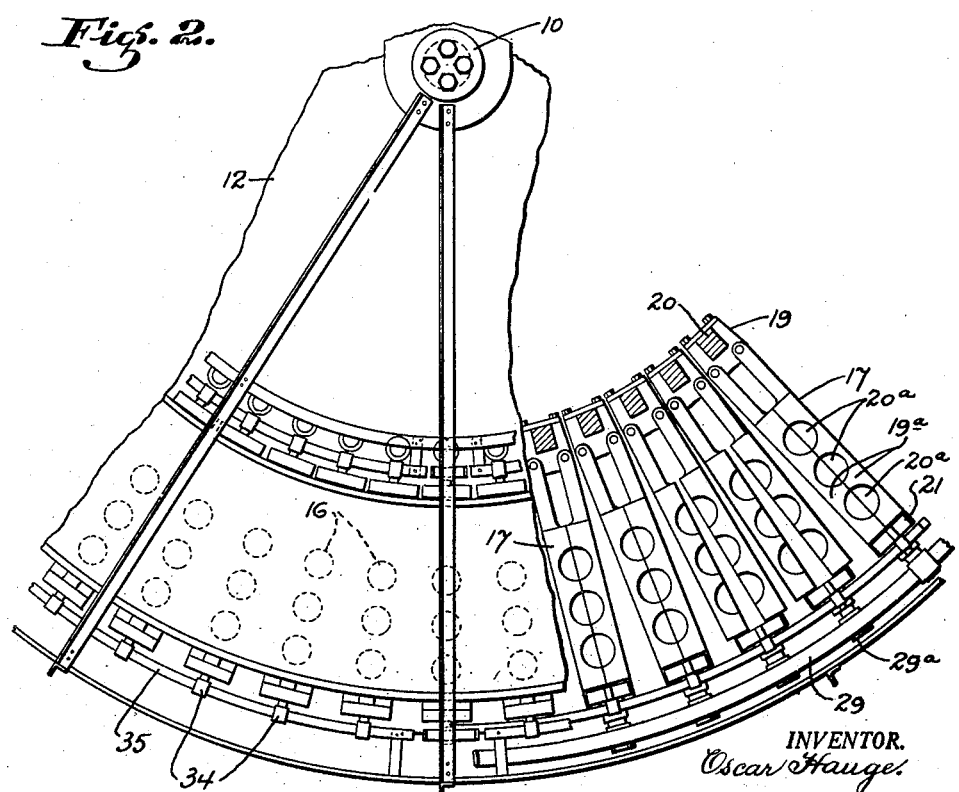
Figure 3:
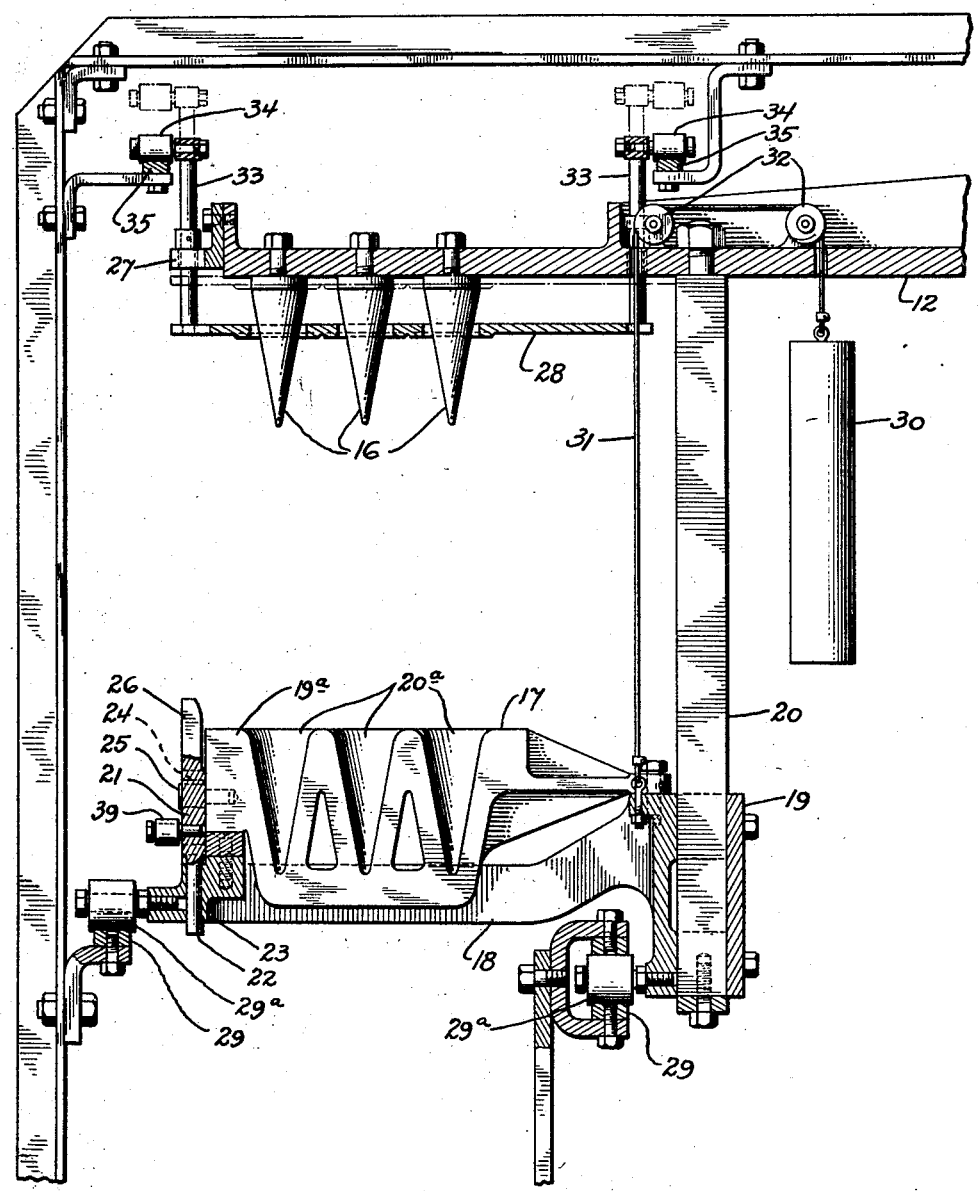
Figure 4:
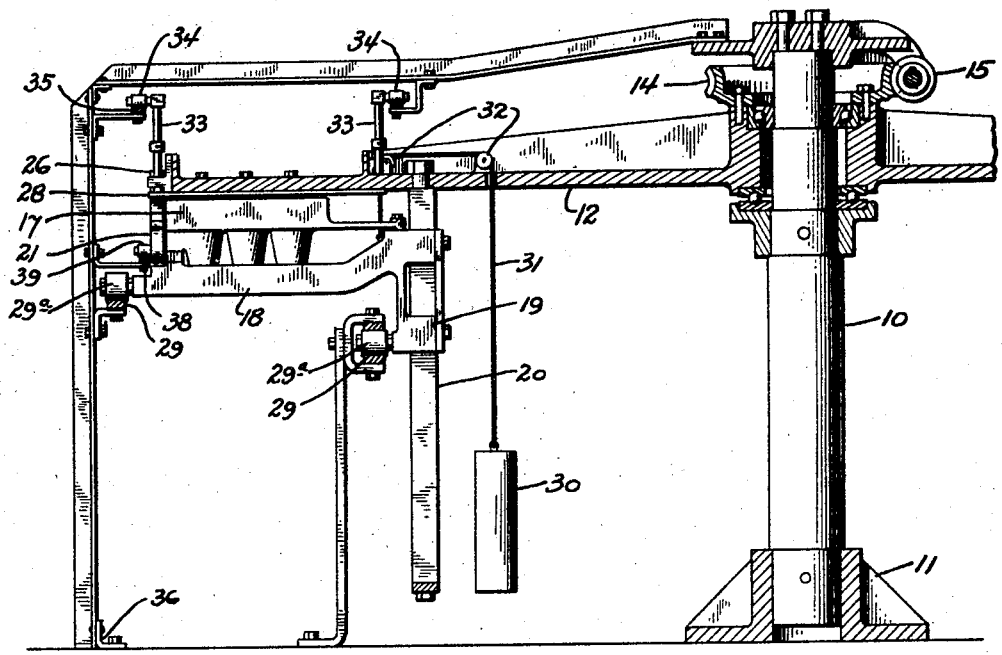
Figure 5:
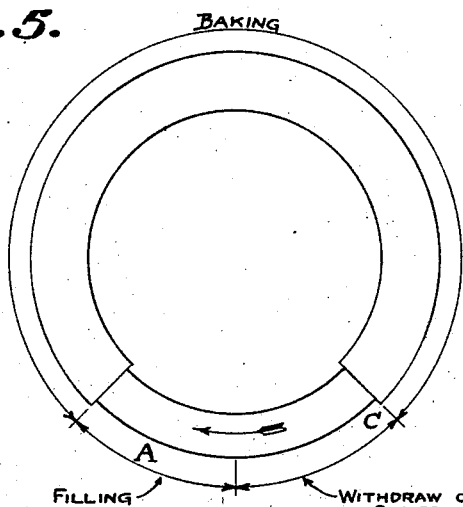

One form which the invention may assume is exemplified in the following description, and illustrated by way of example in the accompanying drawings, in which:

Fig. 1 is a developed diagrammatic view disclosing the operation of the machine, Fig. 2 is a fragmentary view in plan of the machine, with parts thereof broken away to more fully disclose certain features of construction, Fig. 3 is a fragmentary view in vertical section through the machine showing the construction and operation of one of the cone baking units, Fig. 4 is a fragmentary view in vertical section taken centrally through the machine and showing the mounting of the rotary table and the manner in which the molding units are arranged thereon, Fig. 5 is a diagrammatic view disclosing one cycle of the operation of the machine.

Referring more particularly to the accompanying drawings, 10 indicates a central pedestal which is stationarily fixed at its lower end in a base 11. The pedestal 10 extends vertically, and mounted adjacent its upper end, is a horizontal table 12 which is circular in form. Suitable bearings are provided on the pedestal 10 in order that the table 12 may freely rotate thereon.

Fixed to the table 12 about the axis of the pedestal 10 is a worm gear 14 in mesh with which is a worm 15. In practice this worm 15 is driven by an electric motor so that the table will be continuously revolved at a desired rate of speed in one direction. Positioned radially of the table and spaced circumferentially thereabout is a plurality of cone baking units most clearly illustrated in Figs. 3 and 4.

These cone baking units comprise a set of fixed cores 16 which are fixed to the table and depend from the under surface thereof. For cooperation with each set of cores 16 is a mold 17. This mold comprises a frame 18 having a crosshead 19 reciprocally mounted on a depending guide bar 20. The guide bar is secured at its upper end to the table and depends vertically therefrom. The guide bar 20 is preferably square, so that the crosshead 19 on the frame 18 will be held in correct alignment radially of the table. Positioned on the mold frame 18 is a pair of complementary mold halves 19a, each of which is pivotally connected to the frame 18 at its inner end as illustrated in Fig. 2. The mold halves 19a are formed with complementary mold sockets 20, which are in vertical alignment with the cores of the proper core set 16. At the outer end of the mold frame 18 is a cam plate 21, fitted with a guide pin 22 which is guided in a guide socket 23 in the frame 18. The connection between the cam plate 21 and the frame 18 permits the cam plate to vertically reciprocate relative to the frame 18.

Formed in the cam plate 21 is a pair of cam slots 24, which are similar but oppositely disposed. These cam slots 24 receive pins 25 one of which projects from each mold half 19a. When the cam plate 21 is elevated the cam slots 24 cause the mold halves 19a to spread to expand the sockets 20. When the cam plate 21 is moved downwardly to its normal position the mold is closed by bringing the two mold halves 19a together. The cam plate 21 is formed with an aligning member 26 which, when the mold is arranged in cone forming relation to the cores 16, projects through an aligning slot 27 at the outer edge of the table 12 so as to insure that the mold sockets 20 will be in perfect alignment with the cores 16.

After the cones have been baked, the mold halves 19a of each unit are spread apart, as will be described, and the cones adhere to the cores 16. These cones are then automatically stripped from the cores by means of a stripper plate 28 provided for each unit. Each stripper plate is flat, and is formed with recesses adapted to snugly embrace the base of the cores 16. When the cores 16 are projected within the core sockets 20, the stripper plate 28 lies in parallelism with the bottom of the table 12 and the top of the mold halves 19a and in contact therewith, as illustrated in Fig. 4.

When the stripper is operated it is lowered relative to the table 12 and the cores 16, and its lower surface around sockets which receive the cores engages the upper ends of the baked cones and strips them from the cores 16.

To operate the various parts in synchronism, I provide a pair of mold actuating cams 29 which are arcuate and arranged concentrically to the axis of the table. The cams 29 are identical in form, so that the inner and outer ends of each mold will be raised and lowered in unison so as to prevent binding between the crosshead 19 on the frame 18 and the guide bar 20 upon which the mold is mounted for vertical reciprocation. For ease in operation each mold is counterweighted by a counterweight 30 which is suspended beneath the table at the inner end of the mold. The counterweight 30 is connected to the inner end of the adjacent mold by means of a cable 31, led over two idler rollers 32.

To actuate the stripper plate 28 the latter is fitted with two vertical guide rods 33 which are guided for vertical reciprocation through the table. The upper ends of these guide rods 33 are fitted with cam rollers 34 which bear on cams 35. These cams 35 are also arcuate and arranged concentric of the table. Likewise the cams 35 are similar in contour so that both inner and outer ends of each stripper 28 will be raised and lowered in unison.

In operation of the machine, it is constructed and assembled substantially as shown in the accompanying drawings. The major portion of the machine is enclosed within a sheet metal housing supported at the periphery of the machine as at 36 and at its center by the upper extremity of the pedestal 10.

A mechanism is provided for injecting a measured quantity of batter into the molds as they reach a predetermined point in the cycle of operation of the machine. This point is indicated by the letter A, in Fig. 1. Such batter injecting apparatus is old in the art, and forms no part of the invention, and is therefore not illustrated.

The operation of each mold unit is as follows: At the mold filling station A the mold is held closed at a point just below the cores 16. A proper amount of batter is then injected in each socket 20 of the mold. The cams 29 which are engaged by rollers 29a carried by the opposite ends of the mold frame 18 are at this point rising and therefore moving the mold upwardly toward the cores 16. When the mold reaches the high point of the cams 29 the cores will be completely inserted into the mold sockets 20 and a tight joint will be effected between the top of the mold and the stripper plate 28, and between the stripper plate and the under surface of the table so as to prevent the escape of batter about the cores 16.

The cams 29 are then formed with a rest period of considerable length which extends throughout the baking period of the cycle of operations as indicated in Fig. 5. As the cams reach the end of the rest period they arrive at a point indicated by the letter C in Figs. 1 and 5.

At this point I provide a pair of arcuate cams 37 and 38 which cooperate with a roller 39 fitted on the cam plate 21 of each mold. Cam 37 at the point C is engaged by the roller 39 of each mold, and this cam is fitted with a rise moving the cam plate upwardly and thereby causing the mold halves to spread apart, releasing the baked cones therein.

As soon as the mold halves 19a are spread apart and the baked cones are released the rollers 29a commence to descend on the cam 29 in order to withdraw the mold from the cores 16. The cores during this period, of course, travel in a purely horizontal plane. The mold then continues to lower until it is completely disengaged from the core 16 and during this lowering motion the cams 37 and 38 commence to lower so as to lower the cam plate 21 relative to the mold halves 19a. This lowering movement of the cam plate 21 is accomplished by the bringing of the two mold halves together to again close the mold. After the mold has been fully lowered it comes to rest on a short dwell of the cam 29 just prior to being refilled with batter.

Just prior to this the cams 35 are formed with a break and additional cams 35a are provided which engage the rollers 34 and lower the stripper plate 28 relative to the core 16 so as to strip the cones from the cores. Immediately after passing the cams 35a, the rollers 34 re-engage the cams 35 and the stripper plates are re-positioned tightly at the base of the cores.

I desire to point out that the guiding mechanism upon which the molds are mounted is positioned below the table, so that the wearing surface between the molds and their guides may be maintained properly lubricated. The heat of course will seek to rise and will be most intense above the guide rods 20.

From the foregoing it is obvious that I have provided an improved cone baking machine which is continuous in operation, and fully automatic, and which will have a large capacity, and will not require frequent repairs. It is also pointed out that all of the operative parts of the machine are positively actuated, insuring a correct functioning of the machine.

While I have shown the preferred form of my invention, it is to be understood that various changes may be made therein by those skilled in the art, without departing from the spirit of the invention as defined in the appended claims.

Having thus described my invention, what I claim and desire to secure by Letters Patent is:

1. A machine of the character described, comprising a plurality of radially positioned circumferentially spaced cores adapted to revolve in a horizontal plane about a common axis, radially arranged molds in constant alignment with the cores and mounted for cooperation with the cores, and means for automatically operating the molds to embrace the cores and disengage from the cores in subsequent steps with an intervening lapse of time.

2. In a machine of the character described, a horizontally disposed table mounted for rotation, a plurality of cores arranged radially on the table and spaced circumferentially apart, a plurality of molds carried by the table in constant alignment with the cores, said molds being mounted for reciprocation vertically toward and away from the cores, and means for automatically operating the molds to embrace the cores and to withdraw from the cores in subsequent steps with an intervening lapse of time.

3. In a machine of the character described, a table mounted for rotation in a horizontal plane, a plurality of cores fixed to the table, said cores being arranged radially of the table at spaced intervals about the center thereof and depending from the lower surface of the table, molds carried by the table and arranged beneath the cores in constant vertical alignment therewith, said molds being mounted on the table for vertical reciprocation toward and away from the cores, and means for operating the molds to embrace the cores and disengage from the cores in subsequent steps with an intervening lapse of time.

4. In a machine of the character described, a rotatable table, cores arranged on the under surface of said table radially thereof at spaced intervals about the circumference of the table, molds carried by the table in vertical alignment with the cores, connections between the molds and the table enabling the molds to reciprocate vertically with respect to the cores, said molds being expansible, and means for operating the molds to close and embrace the cores and expand and disengage from the cores in subsequent steps during each cycle of operation of the table.

5. In a machine of the character described, a horizontal table revolvable about its central axis in a horizontal plane, sets of cores fixed to the table depending from the lower surface thereof, said sets of cores being arranged radially on the table and spaced circumferentially apart, a mold for each set of cores, each mold comprising a pair of complementary halves formed with complementary sockets to receive the cores, said mold halves being mounted for relative movement circumferentially of the table, means for operating the molds to embrace the cores, spread apart to release the baked cone, and be disengaged from the cores in subsequent steps during each cycle of operation.

6. In a machine of the character described, a horizontal rotatable table, a guide bar depending therefrom, a mold having a frame guided for vertical reciprocation on said guide bar, said mold including a pair of mold halves pivotally connected at their inner ends to the mold frame whereby they will be permitted to move relative to each other circumferentially of the table, a cam plate at the outer end of the mold halves and guided for vertical reciprocation relative to the mold frame, said cam plate being formed with cam slots, and means on the mold halves engaging said slots, whereby vertical reciprocation of the cam plate will be accomplished by spreading and closing of the mold halves.

7. In a machine of the character described, a horizontally rotatable table, a set of cores rigidly fixed thereto in a radial line thereon and depending from the undersurface thereof, a guide bar projecting downwardly from the under surface of said table, a molding unit including a molding frame guided for vertical movement on said guide bar, said molding unit including expansible molds for cooperation with said cores, and means for moving the molding unit vertically to cooperate with the cores, then expanding the molding unit, disengaging the same from the cores in subsequent steps during each cycle of operation of the table.

8. A machine of the character described comprising a horizontally arranged table mounted for rotation about its central axis, a set of cores positioned radially on said table and rigidly fixed thereto and depending from the under surface thereof, a guide bar secured at its upper end to the table and projecting downwardly from the under surface thereof, a molding unit guided for vertical reciprocation on said guide bar in alignment with said cores, said molding unit including an expansible mold, cam means for vertically moving the molding unit into cooperative relation to the cores, and removing the molding unit from its cooperative position relative to the cores, and cam means for expanding the mold during the intervening period between the moving of the mold to its operative position relative to the cores and removing it therefrom.

9. A machine of the character described comprising a horizontally arranged table mounted for rotation about its central axis, a set of cores positioned radially on said table and rigidly fixed thereto and depending from the under surface thereof, a guide bar secured at its upper end to the table and projecting downwardly from the under surface thereof, a molding unit guided for vertical reciprocation on said guide bar in absolute alignment with said cores, said molding unit including an expansible mold, cam means for vertically moving the molding unit into cooperative relation to the cores, and removing the molding unit from its cooperative position relative to the cores, and stripper means operative subsequent to the expanding of the mold to strip the cones from the cores.

10. A machine of the class described comprising a rotatable table, a vertical guide thereon, a mold frame mounted for vertical reciprocation on said guide, a pair of mold halves mounted for horizontal movement in said mold frame, means for moving said frame and mold halves simultaneously on said vertical guide, and means for independently moving the mold halves horizontally in said frame.

11. A machine of the class described comprising a rotatable table, a vertical guide thereon, a mold frame mounted for vertical reciprocation on said guide, a pair of mold halves mounted for horizontal movement in said mold frame, means for first moving the mold halves horizontally to separate them, and means for subsequently moving the mold frame and mold halves together on said vertical guide.

OSCAR HAUGE.